(12) United States Patent
Sudau

(10) Patent No.: US 6,368,221 B1
(45) Date of Patent: *Apr. 9, 2002

(54) TORSIONAL VIBRATION DAMPER WITH A GEARSET AND A SHIFT MECHANISM THEREFOR

(75) Inventor: Jörg Sudau, Niederwerrn (DE)

(73) Assignee: Mannesmann Sachs AG, Schweinfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,508

(22) Filed: Apr. 13, 1998

(30) Foreign Application Priority Data

Apr. 19, 1997 (DE) .......................... 197 16 488

(51) Int. Cl.⁷ ................................. F16D 3/12
(52) U.S. Cl. ..................... 464/68; 464/38; 475/347
(58) Field of Search ................ 464/1, 30, 68, 464/100, 38; 74/574; 192/208, 213.31, 214.1; 475/257, 264, 298, 347

(56) References Cited

U.S. PATENT DOCUMENTS

| | | | | |
|---|---|---|---|---|
| 2,094,669 A | * | 10/1937 | Pratt | 475/264 |
| 3,129,609 A | * | 4/1964 | Rouanet | 475/264 |
| 5,310,382 A | | 5/1994 | Guimbretiere | |
| 5,551,928 A | * | 9/1996 | Sudau | 475/347 |
| 5,816,973 A | * | 10/1998 | Sudau et al. | 74/574 |
| 5,863,274 A | * | 1/1999 | Jackel | 475/347 |
| 5,931,735 A | * | 8/1999 | Schierling | 464/68 |

FOREIGN PATENT DOCUMENTS

| | | |
|---|---|---|
| DE | 36 30 398 | 5/1987 |
| DE | 3643272 | 6/1988 |
| DE | 38 34 284 | 4/1990 |
| DE | 44 44 196 | 6/1995 |
| DE | 197 00 851 | 7/1997 |
| GB | 2 285 109 | 6/1995 |
| GB | 2 290 597 | 1/1996 |

* cited by examiner

Primary Examiner—Lynne H. Browne
Assistant Examiner—Greg Binda
(74) Attorney, Agent, or Firm—Cohen, Pontani, Lieberman & Pavane

(57) ABSTRACT

A torsional vibration damper with a driving-side transmission element and a driven-side transmission element which is rotatable relative to the driving-side transmission element and which is connected with the driving-side transmission element by a damping device. A gearset having at least a driving-side gearset element and a driven-side gearset element is associated with the damping device, wherein introduced torsional vibrations can be transmitted to the damping device with gear shifting by means of the gearset. The gearset is provided with a shift mechanism for separating the driving-side gearset element and the driven-side gearset element.

8 Claims, 1 Drawing Sheet

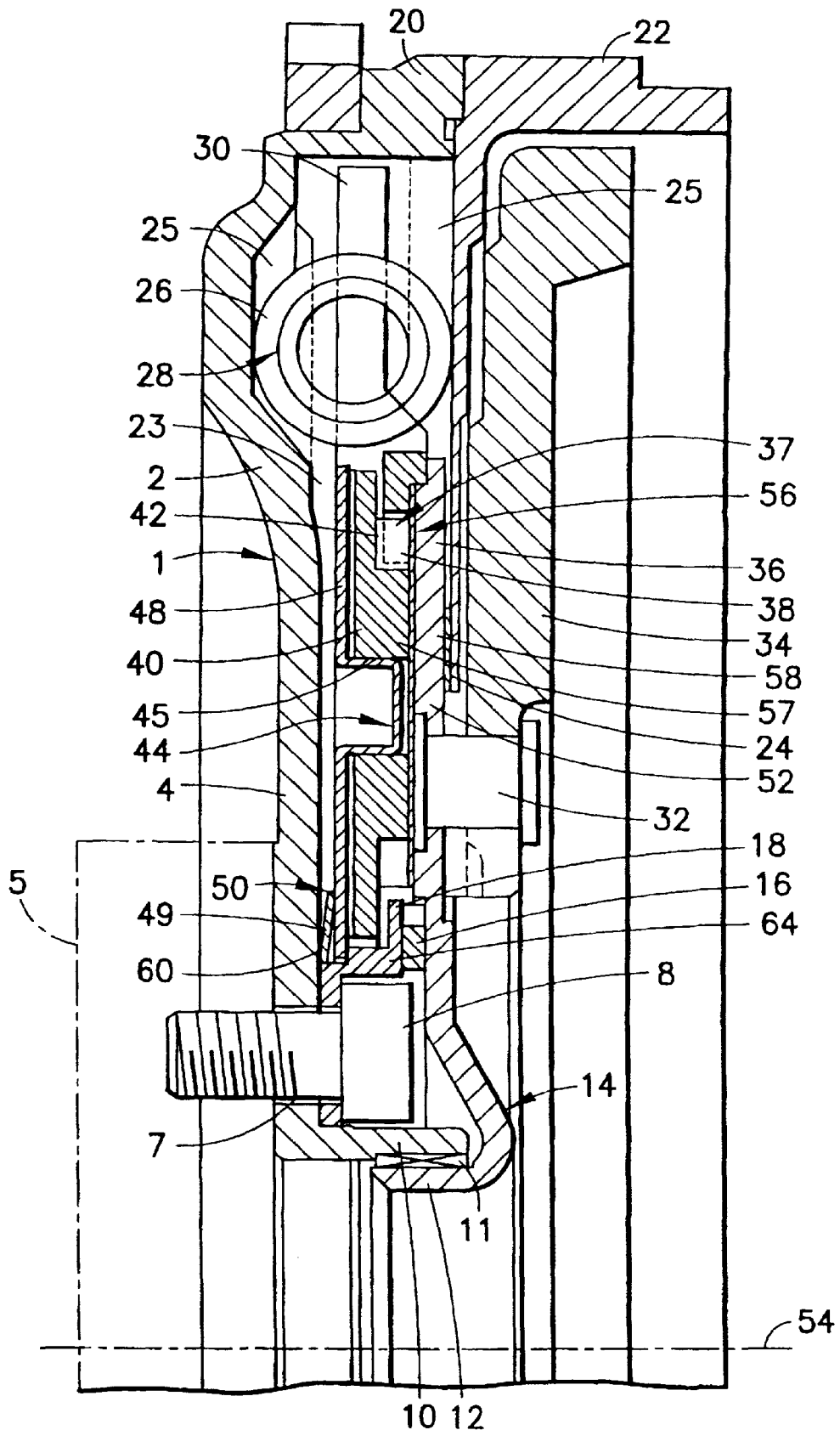

TORSIONAL VIBRATION DAMPER WITH A GEARSET AND A SHIFT MECHANISM THEREFOR

BACKGROUND OF THE INVENTION

The invention is directed to a torsional vibration damper with a driving side transmission element.

DE 44 44 196 A1 shows a torsional vibration damper having a driving-side transmission element in the form of a first flywheel mass and a driven-side transmission element in the form of a second flywheel mass which is rotatable relative to the first flywheel mass. The two flywheel masses are connected with one another by a damping device in the form of energy accumulators, wherein a gearset comprising at least one driving-side gearset element in the form of a planet wheel in a working connection with a sun wheel and comprising a driven-side gearset element in the form of a ring gear is associated with the damping device. The torsional vibrations introduced on the drive side can be transmitted to the damping device with a gear ratio or gear shifting by means of the gearset. As can be seen from the Offenlegungsschrift, or laid open application, this results in the advantage of a different adjustment capability of the energy accumulators, so that the driving-side transmission element and the driven-side transmission element have only a small relative rotation relative to one another. This results approximately in the effect of a comparatively large total mass so that the mass moment of inertia which acts counter to fluctuations in the synchronous running of the driving means is apparently increased compared with a torsional vibration damper in which larger relative movements are possible between the individual masses. This results in small variations in torque at the engine front.

Among the positive contributions to these results is the fact that with the introduction of torsional vibrations and the resulting relative movements between the driving-side and the driven-side transmission elements, the gearset elements are accelerated, so that fast relative deflections of the transmission elements due to the high acceleration at the gearset elements have the effect of a large mass moment of inertia. The effect of this large mass moment of inertia is particularly advantageous at low rates of rotation of the driving means, for example, an internal combustion engine, because the natural frequency of the torsional vibration damper in lower speed ranges can be damped by an increasing mass moment of inertia, so that the torsional vibration damper always stays above the critical range at the normal operating speeds of such an internal combustion engine.

With an increasing rate of rotation in the internal combustion engine, however, the introduced torsional vibrations reach higher frequencies at a small magnitude, so that the large mass moment of inertia undesirably manifests itself in that these torsional vibrations are transmitted to the transmission side without satisfactory dampening.

In another torsional vibration damper described in DE 36 30 398 A1, the dampening device must make do without a gearset bringing about a gear ratio change. Because of the lower mass moment of inertia compared with the torsional vibration damper discussed above, this torsional vibration damper is disadvantageous at lower rates of rotation, but exhibits better dampening of characteristics at higher rates of rotation, for example, above 2,500 RPM, due to the smaller mass moment of inertia.

An object of the present invention is to provide a torsional vibration damper with improved dampening characteristics for introduced torsional vibrations at any desired rate of rotation of the driving means.

SUMMARY OF THE INVENTION

The above stated object is obtained by a damper according to the invention wherein the damper has a gearset which is provided with a shift mechanism for separating the driving-side gear set element from the driven-side gearset element.

An advantage of employing a gearset with the damping device of a torsional vibration damper, is that when the elements of the gearset are accelerated, an increased mass moment of inertia occurs which continues to increase with increasing deflection speed between the driving-side transmission element and the driven-side transmission element. The gearset is accordingly maintained in operation as long as a driving device, e.g., an internal combustion engine, connected before the torsional vibration damper, operates at low rates of rotation and therefore in an operating range in which low-frequency torsional vibrations of great magnitude occur which can be adequately damped only with a comparatively large mass moment of inertia. Above a predetermined threshold rate of rotation, for example, 2,500 RPM, at which the damping characteristics of the torsional vibration damper are no longer sufficiently effective due to high-frequency torsional vibrations of smaller magnitude, the shift mechanism is activated so as to effectively disengage the working connection between the driving-side gearset element and the driven-side gearset element, so that the deflection of the transmission elements, relative to one another, no longer results in an acceleration of the gearset elements. Therefore, above this threshold rate of rotation, the torsional vibration damper operates like a torsional vibration damper without a gearset, so that good damping characteristics are also provided above this threshold rate of rotation.

Advantageous embodiments of the invention and shift mechanism can take numerous forms. For example, the shift mechanism, insofar as it acts in dependence on the rate of rotation, can be controlled based on the effective centrifugal force and has, for example, in a simple embodiment, an axial spring which is part of a shift element and which is deformable by the action of centrifugal force in such a way that its axial dimension decreases, but its radial dimension increases. As a result of the deformation of the axial spring, the friction-generating axial force which is exerted by the axial spring on an adjoining part of the shift element decreases, so that this part of the shift element, e.g., a carrier element for receiving the driving-side gearset element, slips relative to the axial spring and accordingly enables the driving-side gearset element to carry out a relative movement which triggers the desired cancellation of the working connection between the driving-side gearset element and the driven-side gearset element.

A shift element of this kind can have a carrier element at which at least one gearset element, for example, the driving-side gearset element, is received. For this purpose, the carrier element, in a simple embodiment, is pressed through proceeding from the opposite side of the gearset to form a bearing pin for the gearset element. This carrier element is preferably movable in the axial direction, but most of all in the rotating direction against the action of the shift mechanism as soon as the axial force exerted by the latter decreases, e.g., when acted upon by a determined centrifugal force. The carrier element is preferably constructed as a ring which is arranged in its radial inner region on a bearing element associated with the hub of the driving-side transmission element. The carrier element is preferably freely rotatable relative to its bearing element, wherein, however, this rotating capability is prevented by the shift mechanism, preferably by means of a frictional engagement, until the predetermined threshold rate of rotation is reached. Above this threshold rate of rotation, however, the carrier element can participate in the movement of the gearset element received by it, as a result of which, the individual gearset elements can no longer move relative to one another and are consequently no longer accelerated relative to one another during relative movements of the transmission elements.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

The drawing is a radial half-view of a torsional vibration damper with a gearset and a shift mechanism for this gearset.

DESCRIPTION OF THE PREFERRED EMBODIMENT

Referring to the drawing, the torsional vibration damper has a driving-side transmission element 1 in the form of a flywheel mass 2 having a primary flange 4 which expands radially outward and which is adapted, in its radial inner region, for a connection of the driving-side transmission element 1 to a crankshaft 5 (shown in dash-dot lines) of a driving device (not shown), for example, an internal combustion engine. The connection is carried out by a fastener 8 which penetrates through openings 7 provided for this purpose in the primary flange 4 and engages the crankshaft 5. The fastener 8 is arranged on the radial outer side of a primary hub 10 of the primary flange 4. The primary hub 10 surrounds a radial bearing 11 which, in turn, encloses a secondary hub 12 of a driven-side transmission element 14. The primary hub 10 projects in the direction of the driven-side transmission element 14, while its secondary hub 12 is oriented in the direction of the driving-side transmission element 1.

A spacer 18, which ensures the required axial distance between the transmission elements 1 and 14 via an axial bearing 16, is likewise held by the fastener 8.

The primary flange 4 has an axial shoulder 20 in the circumferential area. A cover plate 22 extending radially inward is fastened, in turn, at the axial shoulder 20. Cover plate 22, together with the primary flange 4, define a grease chamber 23 in the axial direction. A damping device 28 having energy accumulators 26 is provided in grease chamber 23. The energy accumulators 26 can be acted upon by control elements 25 provided on the grease chamber side at the primary flange 4 and cover plate 22 and are supported at the other end at a hub disk 30 which forms part of the above described driven-side transmission element 14 and is constructed integral with the secondary hub 12 of the driven-side transmission element 14. The hub disk 30, connected by rivets 32 to a driven-side flywheel mass 34 that is likewise associated with the driven-side transmission element 14, acts as a ring gear 36 of a planetary gearset 37 which moreover has at least one planet wheel 40 with a gearing or toothing 42. Both transmission elements 1 and 14 are rotatable about the center axis 54 of the torsional vibration damper and the driven-side flywheel mass 34 is provided for receiving a friction clutch (not shown) which is constructed in a conventional manner.

With respect to the planetary gearset 37, the planet wheel 40 is arranged on a bearing pin 44 of a carrier element 48 for the planet wheel. The bearing pin 44 for receiving the planet wheel 40 is formed by a pushed through portion 45 extending from the side remote of the planet wheel 40 which can be formed, for example, in a deep-drawing process. The planet wheel 40 acts as a driving-side gearset element 57 and the ring gear 36 acts as a driven-side gearset element 58 of a gearset 56. The planet wheel is rotatable about a rotation axis 52 of the bearing pin 44.

Considered in the axial direction, an axial spring 49 is supported at the side of the carrier element 48 remote from the planet wheel 40. This axial spring 49 acts as part of a shift element 60 of a shift mechanism 50 for the gearset 56 in a manner described below wherein the carrier element 48 constitutes another part of the shift element 60. The axial spring 49 contacts the primary flange 4 on the one side and the carrier element 48 on the other side. The carrier element 48 itself is mounted on the above mentioned spacer 18 so that the carrier element 48 is freely rotatable relative to the spacer 18. However, this rotating capability is prevented when the axial spring 49 contacts in a frictional engagement.

The operation of the torsional vibration damper is as follows. At low rotation rates at which acceleration of the gearset elements 57, 58 is advantageous for increasing the mass moment of inertia, the axial spring 49 undergoes virtually no deformation, so that it provides for a friction-generated positive engagement between carrier element 48 and primary flange 4 and accordingly between carrier element 48 and transmission element 1. Accordingly, during relative movements of the transmission elements 1 and 14 with respect to one another, the planet wheel 40 is forced to rotate about its axis of rotation 52 due to the movement of the ring gear 36 which is triggered by these relative movements. As the rate of rotation increases, the axial spring 49 is deformed under the influence of centrifugal force in such a way that its axial dimension decreases, but its radial dimension increases. Considered as a whole, the axial force exerted between the primary flange 4 and the carrier element 48 as a result of the flattening of the axial spring axial spring is reduced, so that the carrier element 48 slips relative to the primary flange 4 after a threshold rate of rotation which can be predetermined by the design of the axial spring 49 or after a threshold centrifugal force which is effective at this threshold rate of rotation. Consequently, as a result of relative movements between the transmission elements 1 and 14, no rotation is initiated at the planet wheel 40 due to the relative movement. Gearset 56 is accordingly ineffective with respect to the generation of an apparently additional mass moment of inertia. The axial spring accordingly acts as part of a shift element 60 of the shift mechanism 50, as was already indicated.

Of course, there are also other embodiments in which, for example, the planet wheel 40 is secured axially on the bearing pin 44 of the carrier element 48 and the latter is displaceable, as needed, in the axial direction until the teeth 38 and 42 of the ring gear 36 and planet wheel 40 disengage by mean of a shift mechanism 50 that can introduce a relatively large axial movement at the carrier element. The shift mechanism can be, for example, a lift cylinder which is received at the primary flange 4 and engages in a fixed manner at the carrier element 48 by its piston rod. However, a condition that must be met in a shift mechanism 50 of this kind is that the axial path available to the carrier element 48 is at least large enough that it corresponds to the depth to which the teeth 38 and 42 can penetrate into one another. However, a disadvantage in an embodiment of this kind is in that, at least with respect to a radial toothing, the reactivation of the gearset 56 can be difficult because the re-engagement of the teeth and accordingly the transmission of torques over the gearset elements 57, 58 is effected in a relatively transitionless manner. Consequently, the embodiment described in detail above is preferred.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

I claim:

1. A torsional vibration damper comprising:
   a driving-side transmission element;
   a driven-side transmission element which is rotatable relative to the driving-side transmission element;
   a damping device operatively connected with the driving-side transmission element;
   a gearset associated with the damping device, said gearset having a shift mechanism and comprising at least a driving-side gearset element and a driven-side gearset element wherein introduced torsional vibrations can be transmitted to the damping device with gear shifting by means of the gearset, said driving side gearset element and said driven side gearset element having a working connection and said shift mechanism can cancel the working connection between the driving-side gearset element and the driven-side gearset element, wherein said driving side gearset element comprises an axial spring, said axial spring having an axial dimension and a radial dimension, said axial and radial dimensions remaining essentially constant at low rotation rates and changing at increasing rotation rates.

2. The torsional vibration damper of claim 1 wherein the axial spring acts in dependence on centrifugal force.

3. The torsional vibration damper of claim 1 further comprising a carrier element for one of the gearset elements associated with the shift mechanism wherein the working connection between the gearset elements can be cancelled by the carrier element.

4. The torsional vibration damper of claim 3 wherein the axial spring and carrier element are in a frictional engagement which secures against rotation up to a predetermined operation condition.

5. A torsional vibration damper comprising:
   a driving-side transmission element;
   a driven-side transmission element which is rotatable relative to the driving-side transmission element;
   a damping device operatively connected with the driving-side transmission element;
   a gearset associated with the damping device, said gearset having a shift mechanism and comprising at least a driving-side gearset element and a driven-side gearset element wherein introduced torsional vibrations can be transmitted to the damping device with gear shifting by means of the gearset, said driving side gearset element and said driven side gearset element having a working connection and said shift mechanism can cancel the working connection between the driving-side gearset element and the driven-side gearset element, said gearset having a planet wheel;
   a carrier element for the planet wheel having a bearing pin to receive the wheel, said pin being formed such that a punched hole is made from the side facing away from the planet wheel.

6. The torsional vibration damper of claim 5 wherein the driving side gear set element comprises an axial spring which acts in dependence on centrifugal force.

7. The torsional vibration damper of claim 5 wherein the working connection between the gearset elements can be cancelled by the carrier element.

8. The torsional vibration damper of claim 1 wherein the driving side gear set element comprises an axial spring and said axial spring and the carrier element are in a frictional engagement which secures against rotation up to a predetermined operation condition.

* * * * *